(12) United States Patent
Seok et al.

(10) Patent No.: US 10,135,615 B2
(45) Date of Patent: Nov. 20, 2018

(54) VOLTAGE AND TEMPERATURE COMPENSATED DEVICE FOR PHYSICALLY UNCLONABLE FUNCTION

(71) Applicant: THE TRUSTEES OF COLUMBIA UNIVERSITY IN THE CITY OF NEW YORK, New York, NY (US)

(72) Inventors: Mingoo Seok, New York, NY (US); Jiangyi Li, New York, NY (US)

(73) Assignee: THE TRUSTEES OF COLUMBIA UNIVERSITY IN THE CITY OF NEW YORK, New York, NY (US)

( * ) Notice: Subject to any disclaimer, the term of this patent is extended or adjusted under 35 U.S.C. 154(b) by 159 days.

(21) Appl. No.: 15/151,913

(22) Filed: May 11, 2016

(65) Prior Publication Data
US 2016/0337123 A1 Nov. 17, 2016

Related U.S. Application Data

(60) Provisional application No. 62/159,821, filed on May 11, 2015.

(51) Int. Cl.
*H04L 9/00* (2006.01)
*H04L 9/08* (2006.01)

(52) U.S. Cl.
CPC ................... *H04L 9/0869* (2013.01)

(58) Field of Classification Search
CPC ....................................... H04L 9/046
USPC ........................................... 380/46
See application file for complete search history.

(56) References Cited

U.S. PATENT DOCUMENTS

| 6,255,807 B1 * | 7/2001 | Doorenbos | G05F 3/30 323/314 |
| 8,386,801 B2 | 2/2013 | Devadas et al. | |
| 8,415,969 B1 * | 4/2013 | Ficke | G06F 7/588 326/8 |
| 8,694,778 B2 * | 4/2014 | Teuwen | H04L 9/3278 713/168 |
| 8,766,258 B1 | 7/2014 | Dimitrakopoulos et al. | |
| 8,938,792 B2 | 1/2015 | Koeberl et al. | |
| 8,941,405 B2 | 1/2015 | Chi et al. | |

(Continued)

OTHER PUBLICATIONS

Abhranil Maiti, A Large Scale Characterization of RO-PUF; IEEE: 2010; p. 94-99.*

(Continued)

*Primary Examiner* — Monjour Rahim
(74) *Attorney, Agent, or Firm* — Baker Botts L.L.P.

(57) ABSTRACT

Systems and methods for providing assistance for performing a physically unclonable function (PUF) are provided. Disclosed systems can include a PUF bitcell including at least two voltage-compensated proportional-to-absolute (PTAT) generators, each of which can be configured to generate a first voltage and a second voltage that is different from the first voltage by a voltage difference. The voltage difference can be resistant to temperature variations and variations, if any, in the supply voltage. The system can further include a comparator, which can be electrically coupled to each of the at least two PTAT generators, and can be configured to receive the first voltage and the second voltage generated therefrom, determine a polarity of each of the voltage differences, and generate a random bit.

18 Claims, 9 Drawing Sheets

(56) References Cited

U.S. PATENT DOCUMENTS

| | | | |
|---|---|---|---|
| 8,971,527 B2* | 3/2015 | BrightSky | H04L 9/08 380/278 |
| 2005/0186917 A1* | 8/2005 | Rofougaran | H03F 3/245 455/73 |
| 2009/0189591 A1* | 7/2009 | Sperling | G05F 3/30 323/315 |
| 2010/0225407 A1* | 9/2010 | Goyal | H03B 19/00 331/117 FE |
| 2011/0215829 A1 | 9/2011 | Guajardo Merchan et al. | |
| 2013/0106390 A1* | 5/2013 | Wadhwa | G05F 3/30 323/313 |
| 2014/0140502 A1* | 5/2014 | Brightsky | H04L 9/08 380/28 |
| 2014/0269834 A1* | 9/2014 | Eberlein | G01K 7/01 374/178 |

OTHER PUBLICATIONS

2015 Symposium on VLSI Circuits Advance Program Agenda (Jun. 16, 2015 and Jun. 19, 2015).

Alvarez et al., "15fJ/b Static Physically Unclonable Functions for Secure Chip Identification with <2% Native Bit Instability and 140x Inter/Intra PUF Hamming Distance Separation in 65 nm," ISSCC 2015, Digital PLLS and SOC Building Blocks, Session 14, pp. 256-258.

Cortez et al., "Intelligent Voltage Ramp-Up Time Adaptation for Temperature Noise Reduction on Memory-Based PUF Systems," IEEE Transactions on Computer-Aided Design of Integrated Circuits and Systems, 34(7):1162-1175, Jul. 2015.

Maes, et al., "Experimental Evaluation of Physically Unclonable Functions in 65 nm CMOS," ESAT-COSIC & IBBT, Belgium pp. 486-489, Sep. 2012.

Mathew et al., "A 0.19 pJ/b PVT-Variation-Tolerant Hybrid Physically Unclonable Function Circuit for 100% Stable Secure Key Generation in 22nm CMOS," ISSCC 2014, SoC Building Blocks, Session 16, pp. 278-280.

Seok et al., "A Portable 2-Transistor Picowatt Temperature-Compensated Voltage Reference Operating at 0.5V," IEEE JSSC, 47(10):2534-2545 (2012).

Su et al., "A 1.6pJ/bit 96% Stable Chip-ID Generating Circuit using Process Variations," ISSCC 2007, Digital Circuit Innovations, Session 22, pp. 406-407, 611.

* cited by examiner

| Test Name | Stream Length | No. of runs | Pass % | Ave. P-value | Pass? |
|---|---|---|---|---|---|
| Frequency | 256 | 20 | 100% | 0.5276 | YES |
| Block Frequency | 256 | 20 | 100% | 0.4988 | YES |
| Runs | 256 | 20 | 100% | 0.5078 | YES |
| Longest run of ones | 256 | 20 | 100% | 0.5256 | YES |
| Cumulative Sums | 256 | 20 | 100% | 0.4889 | YES |
| FFT | 256 | 20 | 100% | 0.4256 | YES |
| Non-overlapping template matching | 256(m=4) | 20 | 100% | 0.5772 | YES |
| Serial | 256(m=3) | 20 | 100% | 0.4047 | YES |
| Approximate Entropy | 256(m=3) | 20 | 100% | 0.4846 | YES |

Fig. 10

| | [1]* | [2]Sym. | [2]Cent. | SRAM[3] | Buskeeper[4] | [3] | Proposed |
|---|---|---|---|---|---|---|---|
| Technology | 22nm | 0.13μm | 0.13μm | 65nm | 65nm | 65nm | 65nm |
| Norm. bitcell size (um²) | 40.68 | 18.46 | 31.01 | 3.42 | 4.6387 | 25.5 | 3.07 |
| $V_{DD,min}$ (V) | 0.7 | 0.9 | 0.9 | N/A | N/A | 0.7 | 0.6 |
| Unstable Bits at Norm. Cond. | 0.97% | 3.04% | 3.78% | 16.6% | ~4% | 1.73% | 2.00% |
| Temperature range(°C) | 25-50 | 0-80 | 0-80 | 25-85 | -40~85 | 25-85 | 0-80 |
| Bit flipping ratio per 10°C | N/A | 0.68% | 0.635% | >6.67% | 1.14% | 0.47% | 0.44% |
| $V_{DD}$ range (V) | 0.7-0.9 | 0.9-1.2 | 0.9-1.2 | 0.7-1 | N/A | 0.7-1 | 0.6-1.2 |
| Bit flipping ratio per 0.1V | N/A | 1.82% | 1.82% | >16.67% | N/A | 1.3% | 0.13% |
| Norm. Inter-PUF HD | 0.4805 | 0.506 | 0.501 | 0.3321 | 0.491 | 0.5014 | 0.5001 |

VOLTAGE AND TEMPERATURE COMPENSATED DEVICE FOR PHYSICALLY UNCLONABLE FUNCTION

CROSS REFERENCE TO RELATED APPLICATION

This application is related to, and claims priority from, Provisional Patent Application No. 62/159,821, entitled "Voltage and Temperature Compensated Device for Physically Unclonable Function," which was filed on May 11, 2015, the entire content of which is incorporated by reference herein.

BACKGROUND

Hardware based encryption is a topic within the field of device security and encryption. Physically unclonable functions (PUFs) can produce consistent outputs that are difficult to predict. PUFs can provide an attractive hardware encryption solution when implemented on a physical entity that is embodied in a physical structure (e.g., PUF circuit). A PUF device can be used to produce an unclonable cryptographic key that is resistant to physical attacks. In response to an input challenge, the PUF can generate a response that depends on the input challenge and the unique device-specific physical properties of the PUF device.

PUFs can be a combination of one or more integrated circuits or transistors manufactured with semiconductive material, and can generate a random, unique, and stable output (e.g., a random bit of 0 or 1) based on the underlying physical characteristic of the semiconductive material or integrated circuit. A PUF device can be difficult to duplicate, even given the exact manufacturing process and random process variations in the manufacture of each PUF device.

However, certain PUF devices produce noisy outputs and therefore fail to achieve the stability requirements for a function. For example, certain PUFs are subject to noise induced by temperature and supply voltage variations, and return slightly different responses when queried with the same challenge multiple times. Accordingly, there is a need for PUF devices that are resistant to temperature and supply voltage variations.

SUMMARY

In a first aspect of the present disclosure, systems for performing a physically unclonable function (PUF) are provided. An example system can include a PUF bitcell including at least two voltage-compensated proportional-to-absolute (PTAT) generators, each of which can be configured to generate a first voltage and a second voltage that is different from the first voltage by a voltage difference. The voltage difference can be resistant to temperature variations and variations, if any, in the supply voltage. The example system can further include a comparator, which can be electrically coupled to each of the at least two PTAT generators, and can be configured to receive the first voltage and the second voltage generated therefrom, determine a polarity of each of the voltage differences, and generate a random bit.

A different exemplary system can include an array of PUF bitcells. Each PUF bitcell can include at least two voltage-compensated PTAT generators, each of which can be configured to generate a first voltage and a second voltage that is different from the first voltage by a voltage difference. The voltage difference can be resistant to temperature variations and variations, if any, in the supply voltage. The system can further include a voltage comparator, which can be electrically coupled to each of the at least two PTAT generators, and can be configured to receive the first voltage and the second voltage generated therefrom, determine a polarity of each of the voltage differences, and generate a random bit In some embodiments, each column of the array can include a cascode device to improve supply voltage stability.

In some embodiments, a capacitor can be added to each differential input of the voltage comparator to minimize kick-back noise.

In some embodiments, each of the at least two PTAT generators can include a bandgap circuit including a first diode and a second diode that operate at different current densities. The first diode can generate the first voltage and the second diode can generate the second voltage. The voltage difference between the first voltage and the second voltage can be based on threshold voltage mismatch between the first diode and the second diode. The voltage difference can define a current proportional to absolute temperature. The current can be mirrored to a resistor across P-type current sources.

In some embodiments, each PUF bitcell can include a header pair and a footer pair. The header pair and the footer pair can each include a pair of PTAT generators. The header pair of each PUF bitcell can be upsized and laid out in a common centroid layout to minimize threshold voltage mismatch. The voltage difference of each pair of PTAT generators can be based on threshold voltages of the header pair and the footer pair. The voltage difference can be a random variable with a zero mean and a standard deviation that is based on standard deviations of threshold voltage fluctuations of the header pair and the footer pair.

In some embodiments, a plurality of voltage differences can be generated from the array. Each voltage difference of the plurality of voltage difference can be associated with a bitcell in the array. The voltage compator can be configured to generate the random bit by applying a temporal majority voting scheme to each of a plurality of polarities of the plurality of voltage differences.

The present disclosure also provides methods for performing a physically unclonable function is disclosed. An example method can include generating two or more pairs of first and second voltages having a voltage difference therebetween using two or more corresponding voltage-compensated PTAT generators. The method can further include generating a random bit, using a voltage comparator, that is resistant to temperature variations and variations, if any, in the supply voltage by determining a polarity of the voltage difference of each PUF bitcell.

In some embodiments, the method can further include generating a unique and stable key for security applications using the random bit.

BRIEF DESCRIPTION OF THE DRAWINGS

FIG. 10 illustrates graphs showing results of the inter-PUF and intra-PUF Hamming Distances, in accordance with one or more embodiments.

DETAILED DESCRIPTION

Systems and methods for performing voltage and temperature-compensated physically unclonable functions are described herein. PUFs can be used in security applications as a physically obfuscated key (POK) in cryptographic systems or as a chip-ID. A cryptographic key can be derived from device-intrinsic randomness of a PUF device, which is evaluated by the arrangement of the PUF circuitry. A PUF-based key generator can increase the reproducibility of a noisy PUF evaluation, while exhibiting unpredictability of PUF responses.

According to aspects of the present disclosure, certain PUF designs can be memory-based and can include bi-stable circuits (e.g., circuits with two possible states of logic '0' or '1'). Each combination of transistors which exhibits one of the two possible states can be a bitcell in a PUF device comprising one or more bitcells. The logic states can be dependent on the power-up behaviors of SRAM (static random-access memory) and bus-keepers device, where mismatch between current mirror branches, causing the SRAM bitcell to settle in either a '0' or '1' state, is dependent on random process variations of the PUF device.

According to aspects of the present disclosure, operating parameters, such as temperature and supply voltage, can have an effect on the stability and reproducibility of a PUF bitcell array. In PUF devices, as bitcell footprints increase, noise-induced instability and a lack of robustness can result from temperature and supply voltage ($V_{DD}$) variations. Additionally or alternatively, since PUF devices can operate at near and sub-threshold regime, $V_{DD}$ scalability of such PUF devices can also be limited in order to be integrated with low-voltage digital circuits without requiring additional supply voltage distribution. A memory-based PUF array can further include a temperature sensor in order to mitigate against noise introduced by temperature variation. For example, a temperature sensor can sense ambient temperature and output a temperature dependent output voltage, hereinafter referred to as $V_{temp}$. A controller can generate a calibration voltage based on $V_{temp}$ and the calibration voltage can be used to determine the final PUF array output.

Figure 1:
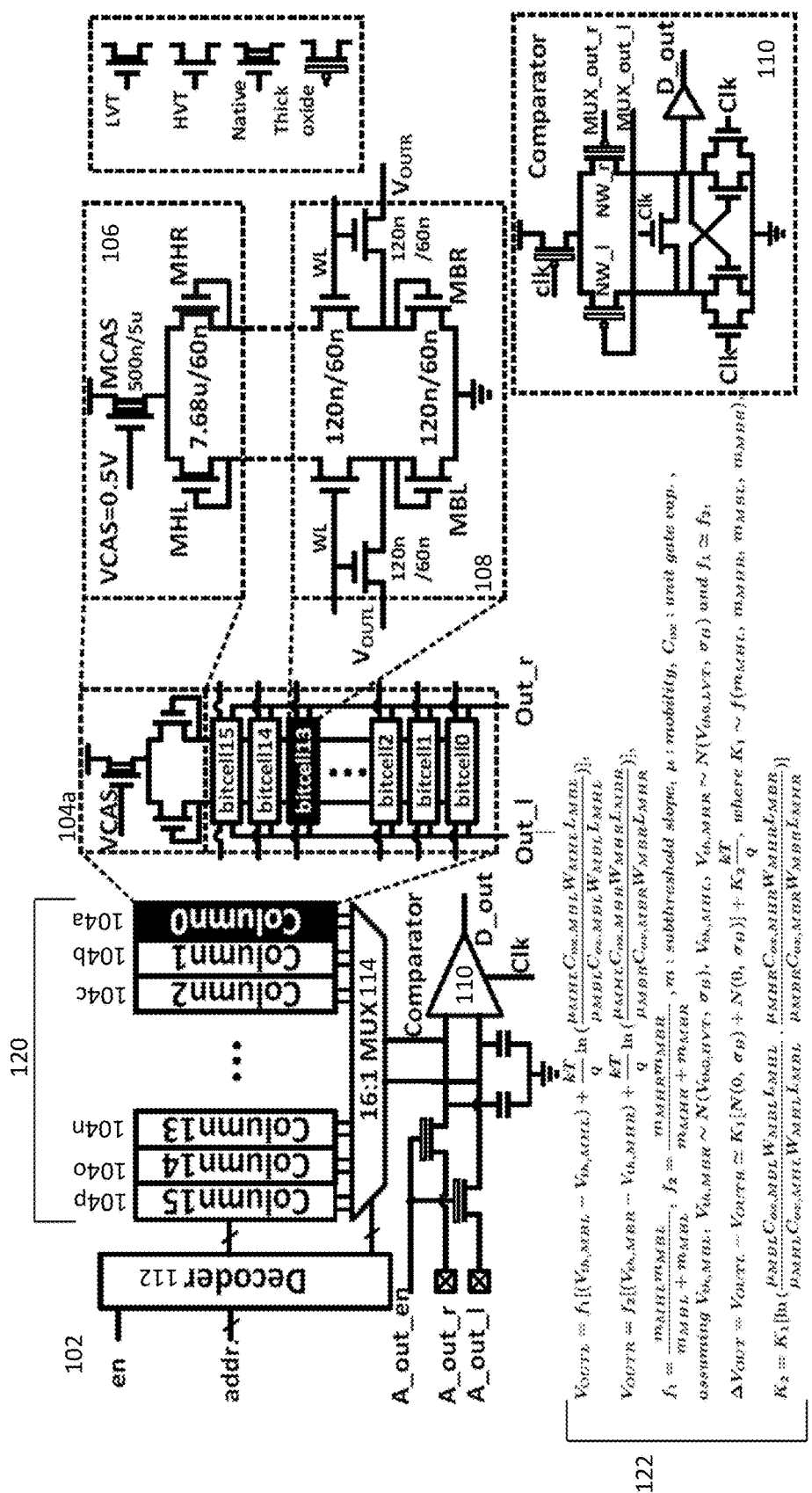
FIG. 1 illustrates a circuit diagram of a PUF device, in accordance with one or more embodiments.

FIG. 1 illustrates a circuit diagram of an exemplary PUF device 102. As illustrated by the example embodiment depicted in FIG. 1, PUF device 102 can include a PUF array 120 comprising a plurality of bitcell columns 104a-104p coupled to an address decoder 112 and a multiplexor 114. The PUF device 102 can also include a voltage comparator 110 configured to generate a random bit that can be resistant to temperature variations and supply voltage variations by determining a polarity of the voltage difference of each PUF bitcell.

In the exemplary PUF device 102 of FIG. 1, the PUF array 120 is a 256-bit PUF array which includes 16 bitcell columns 104a-104p. Each of the sixteen bitcell columns 104a-104p can include 16 bitcells as depicted, as illustrated by the enlarged view of bitcell column 104a in FIG. 1. PUF array can be designed in any technology and/or lithography node (e.g., 65 nm node). As shown in FIG. 1, a header pair circuit 106 can be shared by a plurality of bitcells in a bitcell column such as the sixteen bitcells in bitcell column 104a.

According to embodiments of the disclosed subject matter, each PUF bitcell can include one or more pairs of voltage-compensated proportional-to-absolute-temperature (PTAT) generators. Each PTAT pair can generate two voltages whose difference is voltage- and temperature-compensated and strongly dependent on the mismatch of threshold voltages ($V^{TH}$). By finding the polarity of this difference, a random bit that is robust against temperature and voltage variations can be generated. Each bitcell of the PUF device, for example, can include a PTAT pair. A PUF bitcell can include six NMOS devices, configured into two PTAT generators when its wordline is asserted. For example, a PUF bitcell includes footer pair circuit 106 in combination with the shared header pair circuit 106. The operating principle of the generator can be based on a compact voltage reference. The differential output voltage ($\Delta V_{OUT}$) of the PTAT generator pair, (e.g., $\Delta V_{OUT} = V_{OUTL} - V_{OUTR}$) as derived according to the equations 122 in FIG. 1, can be a function of the threshold voltages ($V_{TH}$s) of headers (e.g., MHL and MHR transistors) and footers (e.g., MBL and MBR transistors). Since header and footer pairs each have the same nominal threshold voltage, $\Delta V_{OUT}$ can be a random variable with a zero mean and a standard deviation that is a function of the standard deviation of headers' and footers' random $V_{TH}$ fluctuations (e.g., $\sigma_H$ and $\sigma_B$). Since $\Delta V_{OUT}$ has no term that is sensitive to temperature and $V_{DD}$, by finding the polarity of $\Delta V_{OUT}$, a random bit can be generated that is stable across temperatures and $V_{DD}$s.

In some embodiments, a suitable PTAT circuit can include a bandgap circuit comprising two diodes operating at different current densities. The voltage difference between the two diodes can define a current that is proportional to the absolute temperature. The PTAT current can be mirrored to a resistor through P-type current sources, where a PTAT voltage is measured across the resistor. A PTAT pair that generates a constant voltage can include a source follower feedback circuit added between P-type current sources and the resistor. Embodiments of the disclosed subject matter can use PTAT pairs directly for random bit generation, instead of temperature sensing.

For example, the 256-bit PUF array 120 according to embodiments of the disclosed subject matter can have a bitcell footprint of 3.07 µm² and exhibit a bit-robustness figure-of-merit (FOM) of 4.03% and a voltage-scalability down to 0.6V with <1% bit-flipping ratios. The bit-robustness FOM can be defined as:

$$\text{FOM} = \sqrt{P_{Nom}^2 + P_V^2 + P_T^2}; \quad (1)$$

where $P_{Nom}$, $P_V$, and $P_T$ are the ratio of unstable bits at nominal condition, that of bit-flipping across ±10% $V_{DD}$ variation, and that of bit-flipping across 0 to 80° C. temperature variation, respectively.

To mitigate against correlation among the bits in the same column as $\Delta V_{OUT}$, which can be a function of the $V_{TH}$ mismatch of headers, the header can be upsized and laid out in a common-centroid style to minimize their mismatch. Each bitcell column can include a cascode device (e.g., MCAS transistor in header pair circuit 106) to improve $V_{DD}$ scalability. A voltage comparator with input-offset (IOS) calibration can be used to determine the polarity of $\Delta V_{OUT}$. Two capacitors, each of which can be ~30 fF, can be added in the differential inputs of the comparator to minimize kick-back noise.

Figure 2:
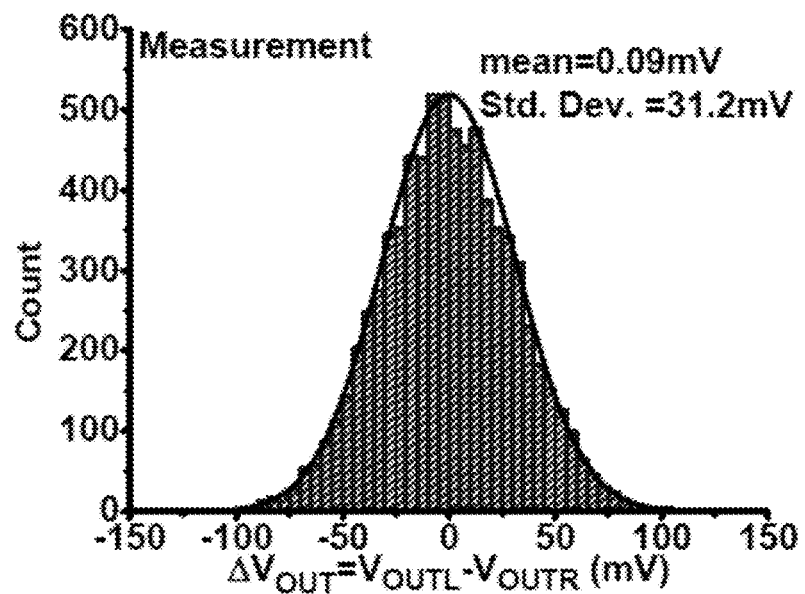
FIG. 2 illustrates a graph of the distribution of output voltage from the various PUF bitcells, in accordance with one or more embodiments.

Measurements can exhibit robust randomness from twenty 256 bit PUF-arrays (e.g. similar to the PUF device 102) across ten dies. FIG. 2 illustrates a graph of the distribution of output voltages from the various PUF bitcells. As illustrated in FIG. 2, the $\Delta V_{OUT}$s from the twenty PUF arrays can exhibit a normal distribution (µ=0.09 mV and σ=31 mV). Post-silicon calibration can be performed to remove the IOS of the comparator (3·σ[IOS]=60 mV), but automatic offset-calibration techniques can also be employed.

Figure 3:
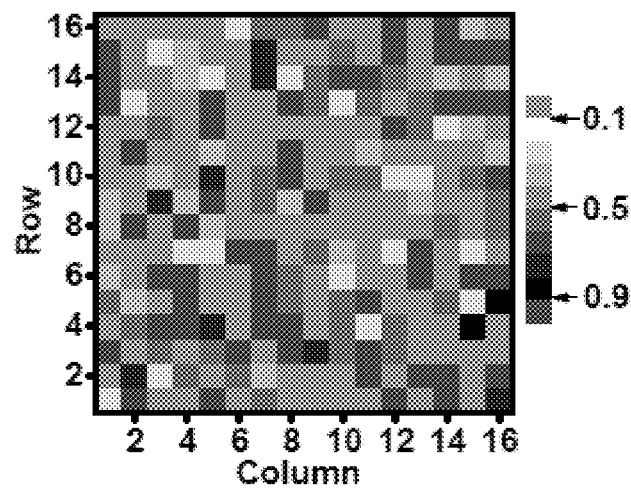
FIG. 3 illustrates a two-dimensional map of the averaged digital post-comparator outputs, in accordance with one or more embodiments.

FIG. 3 illustrates a two-dimensional map of the averaged digital post-comparator outputs. As shown in FIG. 3, the average digital post-comparator output across all arrays show little noticeable spatial artifacts.

As shown in FIG. 2, for some bitcells, $\Delta V_{OUT}$s can exceed 100 mV, but for some bitcells $\Delta V_{OUT}$s can be a few mV. The smaller $\Delta V_{OUT}$s can make a PUF array output sensitive to noise.

Figure 4:
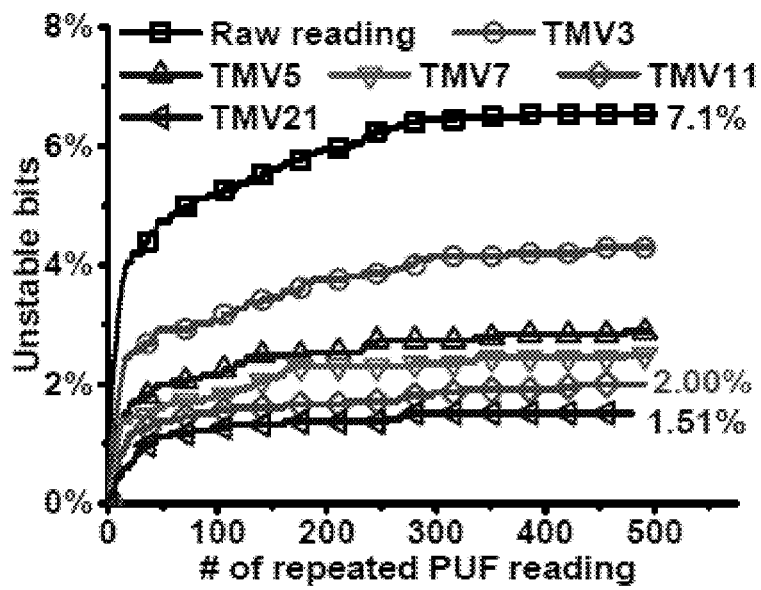
FIG. 4 illustrates a graph showing the measured relationship between the number of PUF readings and unstable bits for different temporal voting schemes, in accordance with one or more embodiments.

FIG. 4 illustrates a graph showing the measured relationship between the number of PUF readings and unstable bits for different temporal voting schemes, in accordance with one or more embodiments. As shown in FIG. 4, up to 7.1% bits of the 256-bit output of a 256 bit PUF array can flip at least once when the output is generated for 500 times. In order to mitigate the instability incurred by noise, a temporal majority voting scheme (TMV) can be employed. A TMV scheme can include taking an odd number of readings of a PUF bitcell and determining how many 1's are read. If a majority of the readings are 1's, the output can be considered to be a 1. The measurement shows that the TMV using 11 and 21 readings (e.g., TMV11 and TMV21, respectively) can reduce the proportions of unstable bits in the 256-bit key down to 2% and 1.51%, respectively.

Figure 5:
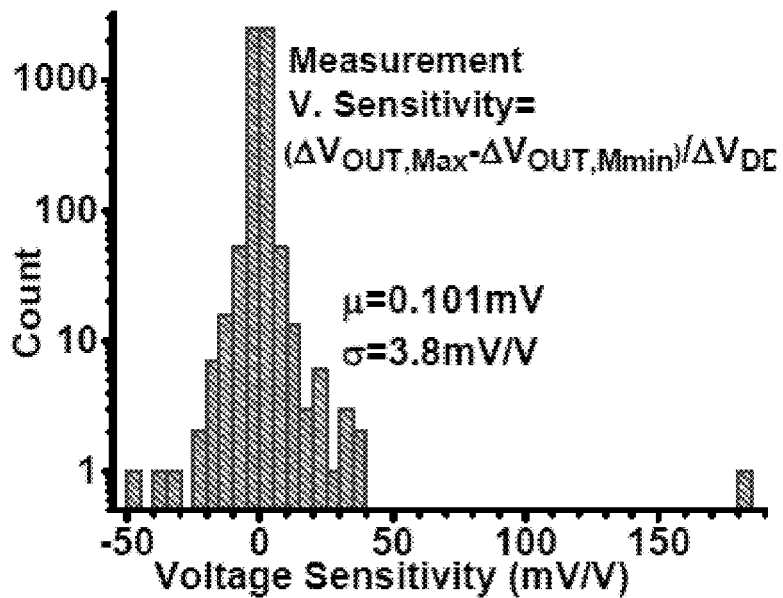
FIG. 5 illustrates a graph showing a measured distribution of output voltage sensitivity, in accordance with one or more embodiments.
Figure 6:
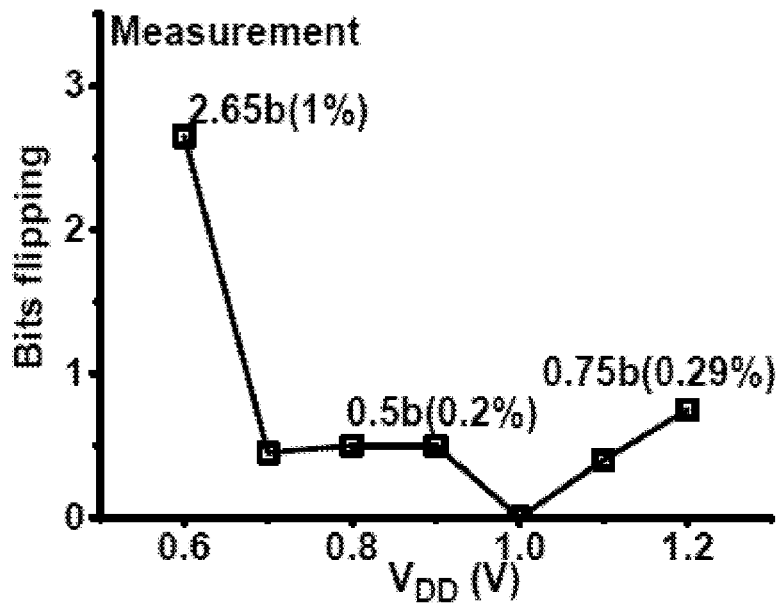
FIG. 6 illustrates a graph showing measurements for flipped bits across supply voltage variations, in accordance with one or more embodiments.

FIG. 5 illustrates a graph showing a measured distribution of output voltage sensitivity As shown in FIG. 5, the disclosed PUF array exhibits strong robustness against $V_{DD}$ variation, which can be expected from the equations 122 shown in FIG. 1. For example, as shown by the graph in FIG. 5, across the 20 PUF arrays, the voltage sensitivity of $\Delta V_{OUT}$ can be measured to be µ=0.1 mV/V and σ=3.8 mV/V. FIG. 6 illustrates a graph showing measurements for flipped bits across supply voltage variations. The bit-flipping ratios across 0.6 to 1.2V can be measured with the output at 1V as a reference. As shown in FIG. 6, after TMV11, the average of the bit-flipping ratios can be measured to be 1%, i.e., 2.65 out of 256 bits, across the 20 PUF arrays.

Figure 7:
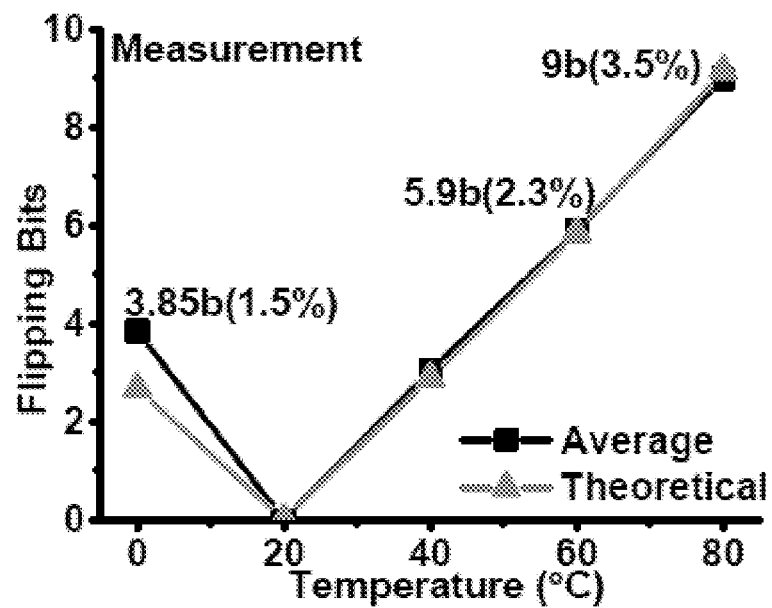
FIG. 7 illustrates a graph showing measurements for flipped bits across temperature variations, in accordance with one or more embodiments.
Figure 8:
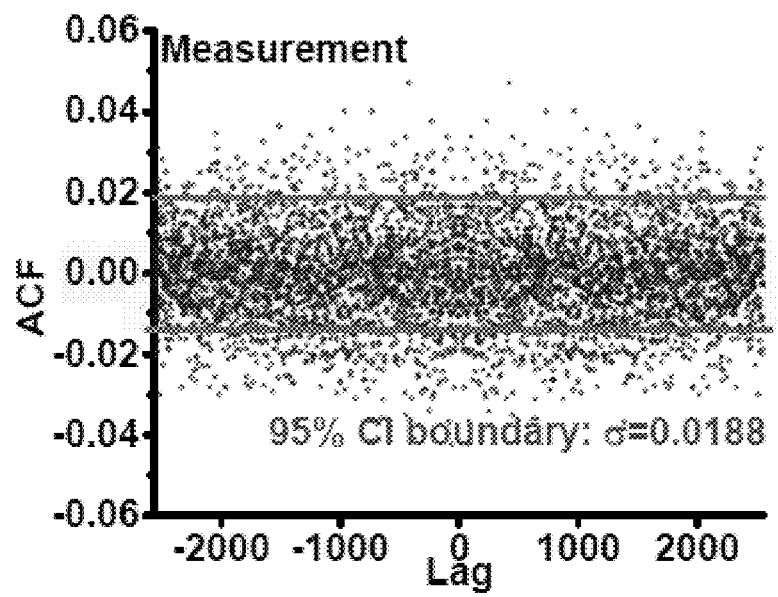
FIG. 8 illustrates measurement results of temperature sensitivity of the output voltage, in accordance with one or more embodiments.

FIG. 7 illustrates a graph showing measurements for flipped bits across temperature variations to measure the robustness against temperature variation. Using the output at 20° C. as a reference, across 0-80° C. the average of the bit-flipping ratios across 20 PUF arrays can be 3.5% after TMV11. FIG. 8 illustrates measurement results of temperature sensitivity of the output voltage. The temperature sensitivity of $\Delta V_{OUT}$ can be evaluated and the distribution of $\Delta V_{OUT}$ and $\Delta(\Delta V_{OUT})$ can be measured per 10° C. as shown in FIG. 8. As $\Delta V_{OUT}$ has weak but some dependence on temperature, temperature variation can affect the PUF output. As shown in FIG. 7, the theoretical lower bound of the bit flipping ratio can be mathematically modeled, using well known techniques, as a random variable, which matches with the measurements.

Figure 9:
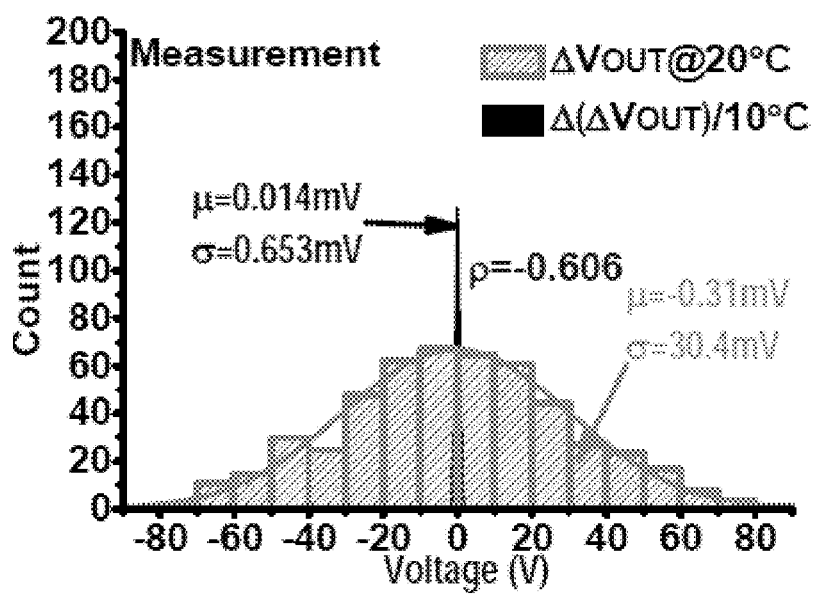
FIG. 9 illustrates randomness measurement results of the disclosed PUF arrays evaluated with an autocorrelation function, in accordance with one or more embodiments.

In some embodiments, the randomness of the disclosed PUF arrays can be evaluated with an autocorrelation function (ACF), NIST randomness test, and Hamming Distance (HD) between the generated keys. FIG. 9 illustrates randomness measurement results of the disclosed PUF arrays evaluated with an autocorrelation function. The autocorrelation function can be configured to cross-correlate the randomness measurement data with itself at different points in time to output the evaluated autocorrelated randomness measurement results.

As shown in FIG. 9, The ACF for 5K bits from 20 PUF arrays shows a 95% confidence bound of σ=0.0188.

FIG. 10 shows a table depicting showing randomness results. As shown by the table in FIG. 14, the generated keys pass all the NIST random tests. The µ and σ of probability of being '1' of the bitcells in 20 PUF arrays can be 49.3% (126.15b) and 3% (7.6b), respectively. The Shannon entropy of the 5K bit generated keys can be 0.9998.

Figure 11:
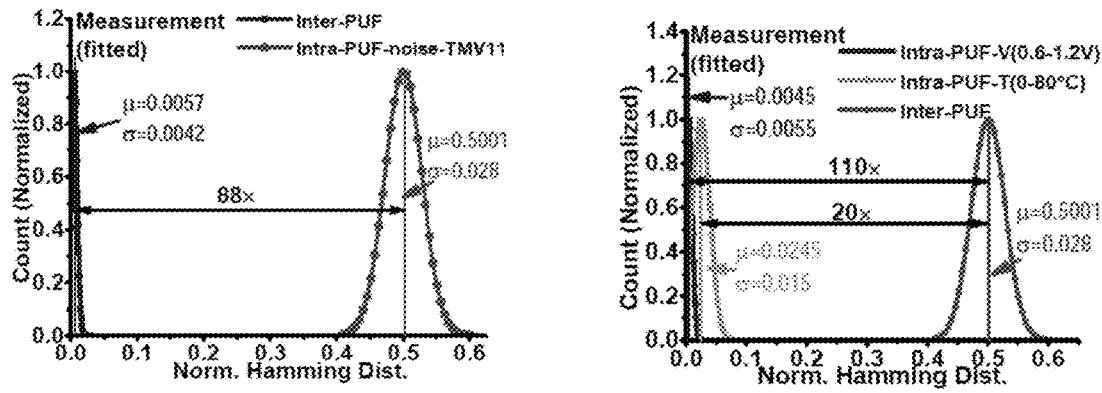
FIG. 11 illustrates a graph showing measurements results of the robustness of the disclosed PUF devices, in accordance with one or more embodiments.

In some embodiments, the inter-PUF HD can be compared between each two of the 20 generated keys. The intra-PUF HD for keys from each PUF array under transient noise and temperature and $V_{DD}$ variations can also be compared. FIG. 11 illustrates graphs showing results of the inter-PUF and intra-PUF Hamming Distances. As shown in FIG. 11, the results can show an average inter-PUF HD (between each two outputs from different array) of 128.03b, ~20× separation between the inter- and intra-PUF HD under temperature variation, as well as 110× and 88× separation under voltage variation and nominal condition, respectively. The average throughput and energy consumption can be measured to be 10.2 Mb/s and 1.1 pJ/bit for native bit generation.

Figure 12:
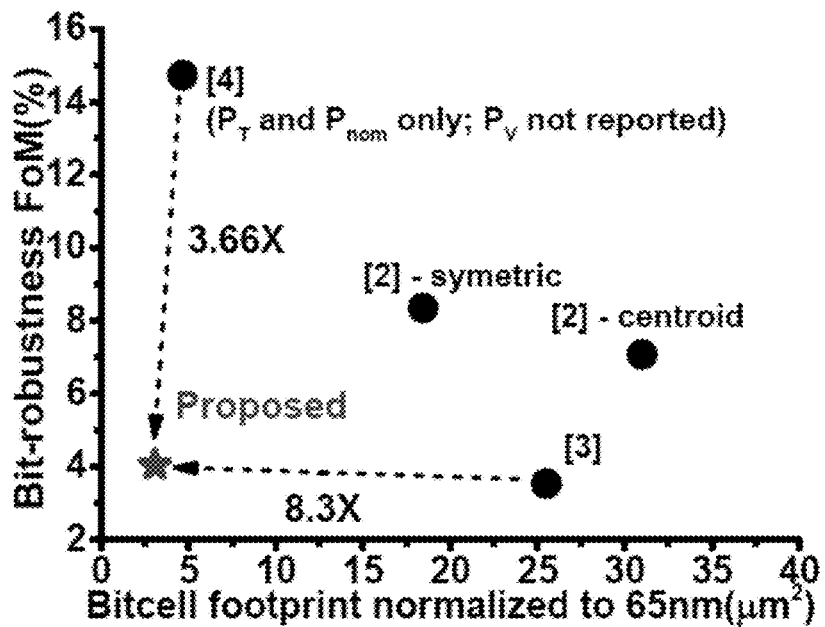
FIG. 12 illustrates a graph showing measurements results of supply voltage scalability of the disclosed PUF devices, in accordance with one or more embodiments.
Figure 13:
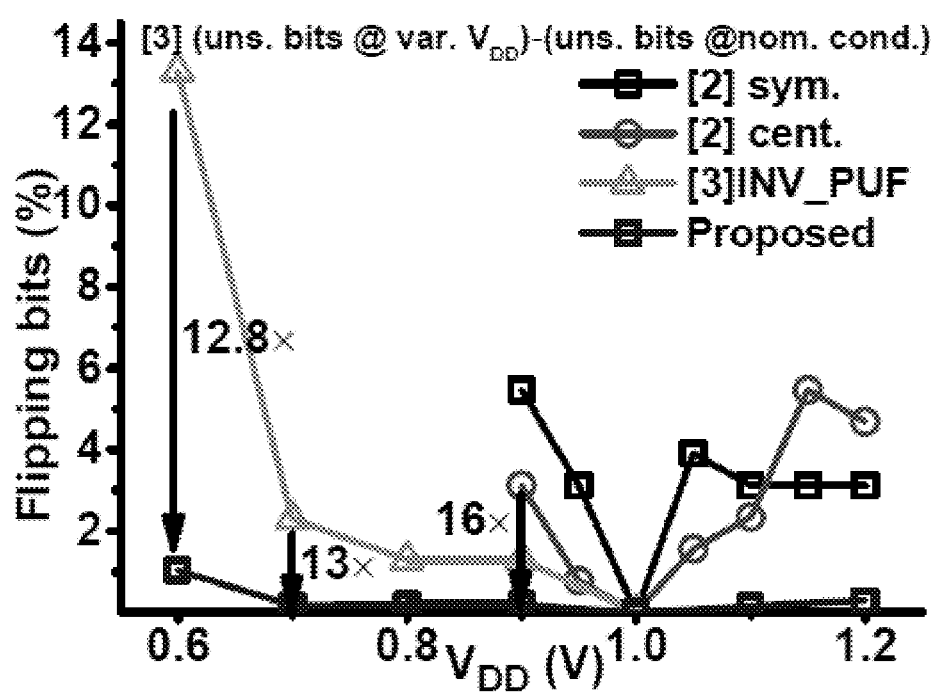
FIG. 13 illustrates an exemplary diagram of a die including PUF devices, in accordance with one or more embodiments.
Figures 14, 15:
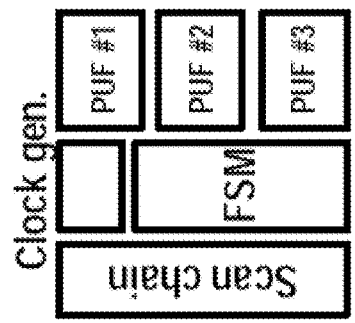
FIG. 14 shows a table depicting showing randomness results, in accordance with one or more embodiments.
FIG. 15 illustrates an exemplary table showing robustness results, in accordance with one or more embodiments.

In some embodiments, robustness measurements of embodiments of the disclosed subject matter as compared to previous designs. FIG. 12 illustrates a graph showing measurements results of the robustness of the disclosed PUF devices. As shown in FIG. 12, the bit robustness FoM can be compared against bitcell footprint size that has been normalized to the 65 nm technology node to measure robustness of the disclosed PUF device (e.g., PUF device 102) against other PUF devices. As shown in FIG. 12, both the bit-robustness FoM and the bitcell footprint of the disclosed PUF device is significantly lower than the other PUF devices. FIG. 13 illustrates a graph showing measurements results of supply voltage scalability of the disclosed PUF devices. FIG. 13 shows the percentage of flipping bits against different values of supply voltage. As shown in FIG. 13, the overall percentage of flipping bits and the variation in bit flipping across different supply voltage values for the disclosed PUF device is significantly lower than other PUF devices. FIG. 14 illustrates an exemplary table showing robustness results. Measurement values and performance metrics (e.g., technology node, normalized bitcell size, minimum supply voltage, percentage of unstable bits at normalized conditions, temperature range, the bit flipping ration per 10° C., the supply voltage range, the bit flipping ration per 0.1V and the normalized inter-PUF Hamming Distance) for the disclosed PUF device (e.g., the proposed device) are listed against such measurement values and metrics for other PUF devices.

FIG. 15 illustrates an exemplary diagram of a die including PUF devices. A bitcell can have footprint of 3.07 $\mu m^2$ (including header area), which is 8.3× smaller than previously designed footprints having comparable robustness. According to an exemplary embodiment, the disclosed design can be 3.66× more robust than the previous smallest one. Additionally or alternatively, as compared to certain other designs, the disclosed design can have a deep voltage scalability, exhibiting, for example, 12.8× and 13× smaller flipping-bit ratios at 0.6 and 0.7V, respectively.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices.

Although one or more embodiments have been described herein in some detail for clarity of understanding, it should be recognized that certain changes and modifications can be made without departing from the spirit of the disclosure. Features of certain embodiments can be combined with features of other embodiments; thus certain embodiments can be combinations of features of multiple embodiments. The embodiments described herein can employ various computer-implemented operations involving data stored in computer systems. For example, these operations can require physical manipulation of physical quantities—usually, though not necessarily, these quantities can take the form of electrical or magnetic signals, where they or representations of them are capable of being stored, transferred, combined, compared, or otherwise manipulated. Further, such manipulations are often referred to in terms, such as producing, yielding, identifying, determining, or comparing. Any operations described herein that form part of one or more embodiments of the disclosure can be useful machine operations. In addition, one or more embodiments of the disclosure also relate to a device or an apparatus for performing these operations. The apparatus can be specially constructed for specific required purposes, or it can be a general purpose computer selectively activated or configured by a computer program stored in the computer. In particular, various general purpose machines can be used with computer programs written in accordance with the teachings herein, or it can be more convenient to construct a more specialized apparatus to perform the required operations.

Although one or more embodiments of the present disclosure have been described in some detail for clarity of understanding, it will be apparent that certain changes and modifications can be made within the scope of the claims. Accordingly, the described embodiments are to be considered as illustrative and not restrictive, and the scope of the claims is not to be limited to details given herein, but can be modified within the scope and equivalents of the claims. In the claims, elements do not imply any particular order of operation, unless explicitly stated in the claims.

Many variations, modifications, additions, and improvements can be made. Plural instances can be provided for components, operations or structures described herein as a single instance. Boundaries between various components, operations and data stores are somewhat arbitrary, and particular operations are illustrated in the context of specific illustrative configurations. Other allocations of functionality are envisioned and can fall within the scope of the disclosure(s). In general, structures and functionality presented as separate components in exemplary configurations can be implemented as a combined structure or component. Similarly, structures and functionality presented as a single component can be implemented as separate components. These and other variations, modifications, additions, and improvements can fall within the scope of the appended claim(s).

What is claimed is:

1. A system for performing a physically unclonable function (PUF) using a supply voltage, comprising:
   a PUF bitcell comprising at least two voltage-compensated proportional-to-absolute (PTAT) generators, each configured to generate a first voltage and a second voltage that is different from the first voltage by a voltage difference, wherein the voltage difference is resistant to temperature variations and variations, if any, in the supply voltage and wherein the voltage difference is a function of mismatch between threshold voltages of the at least two PTAT generators; and
   a comparator, electrically coupled to each of the at least two PTAT generators, configured to receive the first voltage and the second voltage generated therefrom, determine a polarity of each of the voltage differences, and generate, based on the polarity, a random bit that is resistant to variations in temperature and voltage.

2. The system of claim 1, wherein each of the at least two PTAT generators comprises a bandgap circuit comprising a first diode and a second diode that operate at different current densities, and wherein the first diode generates the first voltage and the second diode generates the second voltage.

3. The system of claim 2, wherein the difference of the first voltage and the second voltage is based on threshold voltage mismatch between the first diode and the second diode.

4. The system of claim 1, wherein the voltage difference defines a current that is proportional to absolute temperature and wherein the current is mirrored to a resistor across P-type current sources.

5. The system of claim 1, wherein the PUF bitcell comprises a header pair and a footer pair, wherein the header pair and the footer pair each comprise a pair of PTAT generators.

6. The system of claim 5, wherein the voltage difference of each pair of PTAT generators is based on threshold voltages of the header pair and the footer pair.

7. The system of claim 6, wherein the voltage difference is a random variable with a zero mean and a standard deviation that that is based on standard deviations of threshold voltage fluctuations of the header pair and the footer pair.

8. A system for performing a physically unclonable function (PUF) using a supply voltage, comprising:
an array of PUF bitcells, each comprising:
at least two voltage-compensated proportional-to-absolute (PTAT) generators, each configured to generate a first voltage and a second voltage that is different from the first voltage by a voltage difference, wherein the voltage difference is resistant to temperature variations and variations, if any, in the supply voltage and wherein the voltage difference is a function of mismatch between threshold voltages of the at least two PTAT generators; and
a voltage comparator, electrically coupled to each of the at least two PTAT generators, configured to receive the first voltage and the second voltage generated therefrom, determine a polarity of each of the voltage differences, and generate, based on the polarity, a random bit that is resistant to variations in temperature and voltage.

9. The system of claim 8, wherein each column of the array comprises a cascode device to improve supply voltage stability.

10. The system of claim 8, wherein a capacitor is added to each differential input of the voltage comparator to minimize kick-back noise.

11. The system of claim 8, wherein the at least two PTAT generators comprises a bandgap circuit comprising a first diode and a second diode that operate at different current densities, and wherein the first diode generates the first voltage and the second diode generates the second voltage.

12. The system of claim 8, wherein the difference of the first voltage and the second voltage is based on threshold voltage mismatch between the first diode and the second diode.

13. The system of claim 8, wherein the voltage difference defines a current that is proportional to absolute temperature and wherein the current is mirrored to a resistor across P-type current sources.

14. The system of claim 8, wherein each PUF bitcell comprises a header pair and a footer pair wherein the header pair and the footer pair each comprise a pair of PTAT generators.

15. The system of claim 14, wherein the header pair of each PUF bitcell is upsized and laid out in a common centroid layout to minimize threshold voltage mismatch.

16. The system of claim 14, wherein the voltage difference of each pair of PTAT generators is based on threshold voltages of the header pair and the footer pair.

17. The system of claim 16, wherein the voltage difference is a random variable with a zero mean and a standard deviation that is based on standard deviations of threshold voltage fluctuations of the header pair and the footer pair.

18. The system of claim 8, wherein a plurality of voltage differences is generated from the array, each voltage difference of the plurality of voltage difference associated with a bitcell in the array, and wherein the voltage compator is configured to generate the random bit by applying a temporal majority voting scheme to each of a plurality of polarities of the plurality of voltage differences.

* * * * *